US010807578B2

(12) United States Patent
Lim

(10) Patent No.: US 10,807,578 B2
(45) Date of Patent: Oct. 20, 2020

(54) APPARATUS AND METHOD FOR CONTROLLING SOLENOID VALVE CURRENT OF BRAKE SYSTEM

(71) Applicant: Hyundai Mobis Co., Ltd., Seoul (KR)

(72) Inventor: Jae Il Lim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 45 days.

(21) Appl. No.: 16/139,511

(22) Filed: Sep. 24, 2018

(65) Prior Publication Data

US 2019/0092294 A1    Mar. 28, 2019

(30) Foreign Application Priority Data

Sep. 25, 2017 (KR) .......................... 10-2017-0123269
Oct. 27, 2017 (KR) .......................... 10-2017-0141455

(51) Int. Cl.
*B60T 8/17* (2006.01)
*B60T 13/68* (2006.01)
(Continued)

(52) U.S. Cl.
CPC .......... *B60T 8/17616* (2013.01); *B60T 8/172* (2013.01); *B60T 13/146* (2013.01); *B60T 13/662* (2013.01);
(Continued)

(58) Field of Classification Search
CPC ...... B60T 8/176; B60T 8/17616; B60T 13/66; B60T 13/662; B60T 13/68; B60T 13/686;
(Continued)

(56) References Cited

U.S. PATENT DOCUMENTS 5,890,777 A * 4/1999 Naito .................... B60T 8/4208
303/156
7,530,648 B2    5/2009 Obai
(Continued)

FOREIGN PATENT DOCUMENTS

JP    2003019952 A  * 1/2003
JP    2006-315526     11/2006
(Continued)

OTHER PUBLICATIONS

Machine translation, JP 2003019952. (Year: 2003).*

*Primary Examiner* — Thomas J Williams
(74) *Attorney, Agent, or Firm* — H.C. Park & Associates, PLC

(57) ABSTRACT

A method for controlling a solenoid valve current of a brake system may include: determining, by a controller, whether a difference between the pressure of a master cylinder and the pressure of a wheel cylinder is equal to or more than a preset reference value; and forming, by the controller, the pressure of the wheel cylinder by applying a sine wave pattern to an on/off control pattern while applying a current to a solenoid valve for adjusting the pressure of the wheel cylinder such that the pressure of the wheel cylinder is changed in an LMV control manner based on an upward sloping pattern, when the determination result indicates that the difference between the pressure of the master cylinder and the pressure of the wheel cylinder is equal to or more than a preset reference value.

17 Claims, 7 Drawing Sheets

(51) Int. Cl.
*B60T 13/66* (2006.01)
*B60T 8/1761* (2006.01)
*B60T 13/14* (2006.01)
*B60T 8/172* (2006.01)
*B60T 17/22* (2006.01)

(52) U.S. Cl.
CPC .......... *B60T 13/686* (2013.01); *B60T 17/221* (2013.01); *B60T 2270/403* (2013.01)

(58) Field of Classification Search
CPC ........ B60T 15/028; B60T 15/66; B60T 15/02; B60T 15/36
See application file for complete search history.

(56) References Cited

U.S. PATENT DOCUMENTS

| | | | | |
|---|---|---|---|---|
| 9,205,819 | B2* | 12/2015 | Schmidt | B60T 8/36 |
| 2005/0225164 | A1* | 10/2005 | Obai | B60T 8/5006 |
| | | | | 303/3 |
| 2006/0255659 | A1 | 11/2006 | Obai | |
| 2007/0058321 | A1* | 3/2007 | Asano | F01L 9/04 |
| | | | | 361/160 |
| 2009/0112433 | A1* | 4/2009 | Park | B60T 13/686 |
| | | | | 701/71 |

FOREIGN PATENT DOCUMENTS

| | | | |
|---|---|---|---|
| JP | 2009-184674 | 8/2009 | |
| KR | 10-1439548 | 9/2014 | |
| WO | WO-02087940 A1 * | 11/2002 | .............. B60T 10/02 |

\* cited by examiner

APPARATUS AND METHOD FOR CONTROLLING SOLENOID VALVE CURRENT OF BRAKE SYSTEM

CROSS-REFERENCES TO RELATED APPLICATION

This application claims priority from and the benefit of Korean Patent Application No. 10-2017-0123269, filed on Sep. 25, 2017 and Korean Patent Application No. 10-2017-0141455, filed on Oct. 27, 2017, which are hereby incorporated by reference for all purposes as if set forth herein.

BACKGROUND OF THE INVENTION

Field

Invention Exemplary embodiments of the invention relate to an apparatus and method for controlling a solenoid valve current of a brake system, and more particularly, to an apparatus and method for controlling a solenoid valve current of a brake system, which can control the pressure of a wheel cylinder by controlling a solenoid valve current of a brake system.

Discussion of the Background

In general, the type of a brake body is divided into a disk brake, a drum brake and the like. The brake body is also referred to as a foot brake because the brake body is operated by a driver's foot force. At this time, a hydraulic mechanism is used to transfer the force. A master cylinder is mounted around the base of a brake pedal, and a wheel cylinder is mounted on the brake body. The master cylinder and the wheel cylinder include a brake pipe hose serving as an oil passage.

An anti-lock braking system (ABS) and an electronic stability control (ESC) system generate a magnetic field by passing a current to a solenoid coil, and operate by opening or closing the corresponding solenoid valve using the magnetic field.

In a solenoid valve control device for a general brake system, a master cylinder generates hydraulic pressure when a driver steps on a brake pedal, and the hydraulic pressure is transferred to a wheel cylinder connected through a pipe (brake pipe or brake hose) and operates a brake body which is mounted on an axle serving as a rotating shaft of a wheel and generates frictional heat.

For reference, when a hole is made at any one location of the pipe in the hydraulic mechanism, the hydraulic mechanism may not transfer a force because liquid for transferring hydraulic pressure leaks. Therefore, the hydraulic brake system is necessarily divided into two systems for safety. In general, the right front wheel and the left rear wheel form a pair, and the left front wheel and the right rear wheel form a pair. In this combination, the pipe is formed in an X-shape. Thus, the brake pipe is referred to as an X-shaped system. In this case, the ABS is installed in the middle of the hydraulic pipe.

It is difficult for a driver to stop a vehicle traveling at high speed only with his foot force. Therefore, the vehicle may be stopped through an auxiliary mechanism such as a booster which uses a difference between atmospheric pressure and intake negative pressure. Without a booster, an electric pump may be used to generate hydraulic pressure, thereby raising the hydraulic pressure of the brake hydraulic mechanism in case of need.

When rotation of a wheel is excessively slowed by sudden braking, a lock-up occurs. When such a lock-up occurs, the braking force is extremely reduced, while the braking distance is increased. In this case, the vehicle may slide out of control. Such a situation can be prevented by the ABS.

Basically, the ABS does not transfer hydraulic pressure to the brake (wheel cylinder) of a wheel which is likely to cause a lock-up, but removes the hydraulic pressure of the brake body into an auxiliary tank, thereby weakening the operation of the brake. When the rotational velocity of the wheel reaches a level to exert a braking force, the ABS maintains the state. On the other hand, when the rotational velocity of the wheel becomes so high that the brake cannot sufficiently exert a braking force, the master cylinder transfers hydraulic pressure to the brake body again. The ABS repeats such an operation at each moment, in order to maintain the optimal braking force while preventing a lock-up.

Such an operation of the ABS is performed through control of the solenoid valve, and causes a pressure difference between the master cylinder and the wheel cylinder. That is, a difference occurs between the pressure transferred by the master cylinder and the pressure of the wheel cylinder to control the brake body.

At this time, the pressure of the master cylinder and the pressure of the wheel cylinder may be estimated through a sensor or another mechanism installed in the vehicle. Recently, the use of a sensor is limited in order to raise cost competitiveness. The ABS or ESC system tends to use a pressure sensor only in the master cylinder. Recently, however, such a tendency has been excluded.

Although a sensor is not mounted as described above, the pressure of the wheel cylinder can be estimated through another mechanism installed in the vehicle. Depending on a situation, however, actual pressure formed in the wheel cylinder may be different from the estimated pressure.

Although the actual pressure is different from the estimated pressure, a controller controls the hydraulic pressure of the wheel cylinder by controlling the solenoid valve based on the estimated pressure. Therefore, when the difference between the actual pressure of the wheel cylinder and the estimated pressure increases, the braking performance of the brake may be rapidly degraded.

The related art of the invention is disclosed in Korean Patent Registration No. 10-1439548 registered on Sep. 2, 2014 and entitled "Method for driving solenoid valve circuit".

The above information disclosed in this Background section is only for enhancement of understanding of the background of the invention and, therefore, it may contain information that does not constitute prior art.

SUMMARY

Exemplary embodiments of the invention are directed to an apparatus and method for controlling a solenoid valve current of a brake system, which can perform wheel pressure control in an upward sloping pattern with a cycle through solenoid valve current control of a brake system.

Also, embodiments of the invention are directed to an apparatus and method for controlling a solenoid valve current of a brake system, which can additionally apply an impulse pattern to a sine wave-shaped solenoid control pattern during valve current control, thereby limiting a pressure rise while promoting a pressure rise start.

Also, embodiments of the invention are directed to an apparatus and method for controlling a solenoid valve current of a brake system, which can generate wheel pressure in a linear magnetic valve (LMV) control manner by combining partial patterns of a sine wave to an on/off control method using a pulse wave during valve current control.

In one embodiment, a method for controlling a solenoid valve current of a brake system having a master cylinder, a wheel cylinder and a solenoid valve to control flow from the master cylinder to the wheel cylinder, include: determining, by a controller, whether the difference between a pressure of a master cylinder and a pressure of a wheel cylinder is equal to or greater than a preset reference value; and controlling, by the controller, pressure of the wheel cylinder by applying a sine wave current pattern to an on/off control pattern while applying a current to a solenoid valve to adjust the pressure of the wheel cylinder such that the pressure of the wheel cylinder is changed cyclically in an upward sloping pattern, when the difference between the pressure of the master cylinder and the pressure of the wheel cylinder is equal to or greater than the preset reference value.

The current may be cyclically applied to the solenoid valve to change the pressure of the wheel cylinder in a linear magnetic valve (LMV) control manner.

The controller may apply one or more of first quarter pattern of the sine wave current, a second quarter pattern of a sine wave current, a third quarter pattern of a sine wave current, and a fourth quarter pattern of a sine wave current within to the on/off control pattern.

The controller may completely open the solenoid valve by applying a current according to an on/off control method, and then close the solenoid valve by applying a current according to the shape of the first quarter pattern of the sine wave current.

After the solenoid valve is closed by applying a current according to the on/off control method, the controller may open the solenoid valve by applying a current according to the third quarter pattern of the sine wave current, and then close the solenoid valve by applying a current according to the first quarter pattern of the sine wave current.

After the solenoid valve is closed by applying a current according to the on/off control method, the controller may open the solenoid valve by applying a current according to the second quarter pattern of the sine wave current, and then close the solenoid valve by applying a current according to the first quarter pattern of the sine wave current.

The wheel pressure waveform of the wheel cylinder may be changed in response to a peak-to-peak value, a cycle and a slope of the sine wave current.

The upward sloping pattern of the wheel pressure may include a pressure increase pattern which is changed in an upward sloping pattern as a whole while the pressure of the wheel cylinder is repeatedly decreased, maintained and increased.

In another embodiment, an apparatus for controlling a solenoid valve current of a brake system includes: a solenoid valve to adjust pressure in a wheel cylinder; and a controller to generate the pressure in the wheel cylinder by applying a sine wave pattern to an on/off control pattern while applying a current to the solenoid valve such that the pressure in the wheel cylinder is changed cyclically in an upward sloping pattern, when a difference between the pressure in the master cylinder and the pressure in the wheel cylinder is equal to or greater than a preset reference value.

The solenoid valve configured to adjust pressure in the wheel cylinder may include a normally open valve or inlet valve.

The controller may apply one or more of first quarter pattern of a sine wave current, a second quarter pattern of a sine wave current, a third quarter pattern of a sine wave current, and a fourth quarter pattern of a sine wave current within the on/off control pattern.

The controller may completely open the solenoid valve by applying a current according to an on/off control method, and then close the solenoid valve by applying a current according to the shape of the first quarter pattern of the sine wave current.

After the solenoid valve is closed by applying a current according to the on/off control method, the controller may open the solenoid valve by applying a current according to the third quarter pattern of the sine wave current, and then close the solenoid valve by applying a current according to the first quarter pattern of the sine wave current.

After the solenoid valve is closed by applying a current according to the on/off control method, the controller may open the solenoid valve by applying a current according to the second quarter pattern of the sine wave current, and then close the solenoid valve by applying a current according to the first quarter pattern of the sine wave current.

A wheel pressure waveform of the wheel cylinder may be changed in an LMV control manner based on an upward sloping pattern and in response to a peak-to-peak value, a cycle and a slope of the sine wave current.

An upward sloping pattern of the wheel pressure may include a pressure increase pattern which is changed in an upward sloping pattern as a whole while the pressure of the wheel cylinder is repeatedly decreased, maintained and increased.

In another embodiment, an apparatus for controlling a solenoid valve current of a brake system includes: a solenoid valve to adjust pressure in a wheel cylinder; and a controller to apply a current with a cycle in a downward sloping pattern to the solenoid valve such that the pressure of the wheel cylinder is changed in an upward sloping pattern, and additionally apply an impulse current to the solenoid valve, when a difference between pressure in a master cylinder and pressure in the wheel cylinder is equal to or greater than a preset reference value.

The controller may additionally apply an impulse pattern at a preset effective point in a sine wave current.

The effective point may be set in each of a rising period and falling period of the sine wave current.

The controller may apply an impulse-type rising pattern in the rising period of the sine wave current, and applies an impulse-type falling pattern in the falling period of the sine wave current.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principle of the invention.

DETAILED DESCRIPTION OF THE ILLUSTRATED EMBODIMENTS

Figure 1:
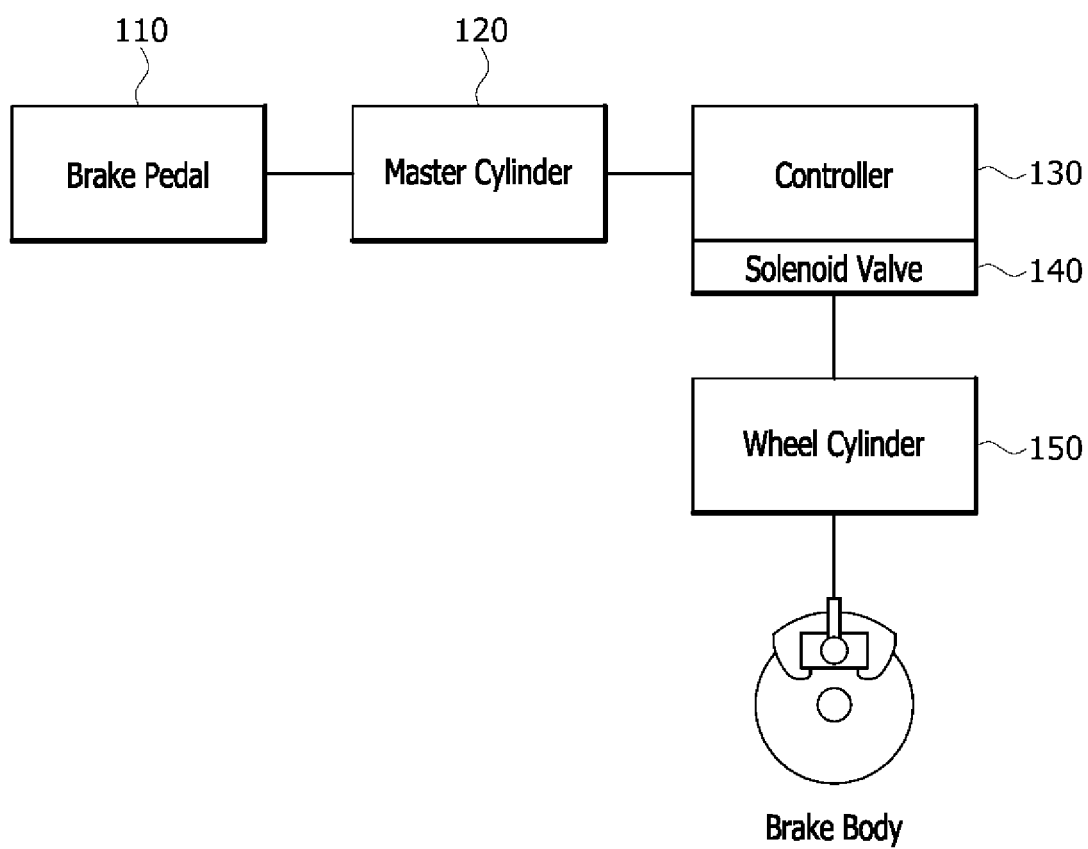
FIG. 1 is a block diagram illustrating an apparatus for controlling a solenoid valve current of a brake system in accordance with an embodiment of the invention.

The invention is described more fully hereinafter with reference to the accompanying drawings, in which embodiments of the invention are shown. This invention may, however, be embodied in many difference forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, an apparatus and method for controlling a solenoid valve current of a brake system in accordance with an embodiment of the invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
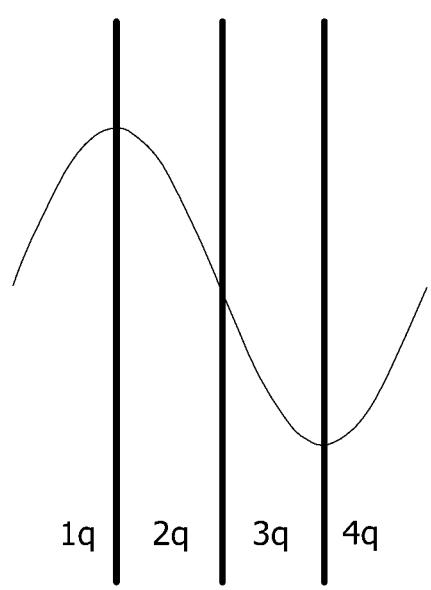
FIG. 2 illustrates the quarters of a sine wave in accordance with the embodiment of the invention.
Figure 3:
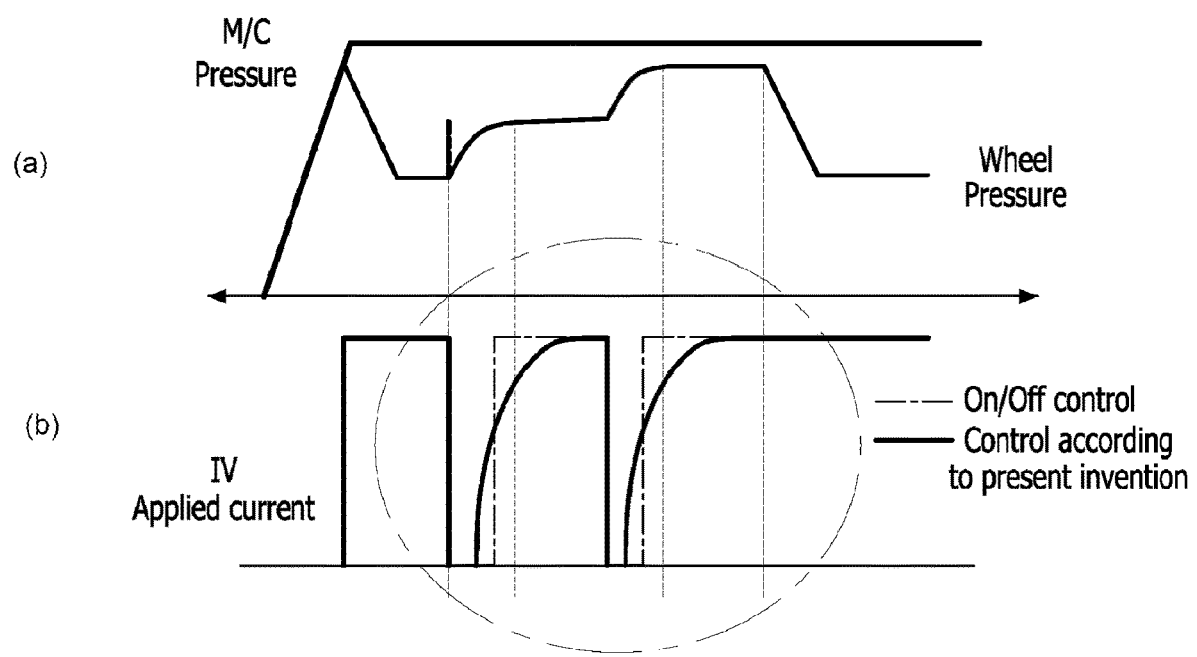
FIG. 3 illustrates solenoid valve current control patterns of a brake system in accordance with the embodiment of the invention.

FIG. 1 is a block diagram illustrating an apparatus for controlling a solenoid valve current of a brake system in accordance with an embodiment of the invention, FIG. 2 illustrates the quarters of a sine wave in accordance with the embodiment of the invention, FIG. 3 illustrates solenoid valve current control patterns of a brake system in accordance with the embodiment of the invention.

Referring to FIG. 1, the apparatus for controlling a solenoid valve current of a brake system in accordance with the embodiment of the invention may include a brake pedal 110, a master cylinder 120, a controller 130, a solenoid valve 140 and a wheel cylinder 150.

Referring to FIG. 1, the master cylinder 120 of the apparatus for controlling a solenoid valve current of a brake system in accordance with the embodiment of the invention may generate hydraulic pressure when a driver steps on the brake pedal 110, and the hydraulic pressure may be transferred to the wheel cylinder 150 connected through a pipe such as a brake pipe or brake hose, and thus operate a brake body which is mounted on an axle serving as a rotating shaft of a wheel and actually generates frictional heat.

At this time, the controller 130 may not transfer hydraulic pressure to the wheel cylinder 150 of the brake for a wheel which is likely to cause a lock-up, but remove hydraulic pressure of the brake body into an auxiliary tank, thereby weakening the operation of the brake. When the rotational velocity of the wheel reaches a level to exert a braking force, the controller 130 may maintain the state. On the other hand, when the rotational velocity of the wheel becomes so high that a braking force cannot be sufficiently exerted, the controller 130 may control the master cylinder to transfer hydraulic pressure to the brake body. The controller 130 may repeat such an operation at each moment, in order to maintain the optimal braking force while preventing a lock-up.

The controller 130 may perform the operation by controlling the solenoid valve 140. During this process, a pressure difference may occur between the master cylinder 120 and the wheel cylinder 150. That is, a difference may occur between the pressure transferred by the master cylinder 120 and the pressure of the wheel cylinder 150 to control the brake body. Thus, the controller 130 may estimate a change of the pressure which is actually formed in the wheel cylinder 150, in order to control the solenoid valve 140.

The solenoid valve may serve to control a flow rate from the master cylinder to the wheel cylinder, and include a normally open valve or inlet valve.

Through the solenoid valve current control for the brake system, the controller 130 may perform wheel pressure control in an upward sloping pattern with a cycle, and form a linear magnetic valve (LMV)-controlled wheel pressure by combining a part of a sine wave with an on/off control pattern.

That is, the controller 130 may form the LMV-controlled wheel pressure by applying one or more of first to fourth quarters of the sine wave to the on/off control pattern.

This process will be described with reference to FIGS. 2 and 3.

FIG. 2 illustrates first to fourth quarters 1 q to 4 q of a sine wave current.

That is, the controller 130 may apply one or more patterns of the first to fourth quarters 1 q to 4 q of the sine wave current to the on/off control.

Referring to FIG. 3, the upper graph (FIG. 3A) illustrates the waveform of master cylinder pressure (M/C pressure) and the waveform of wheel cylinder pressure (wheel pressure), and the lower graph (FIG. 3B) illustrates the waveform of a current applied to the solenoid valve (or inlet valve IV) 140 of FIG. 1, which causes a pressure change of the wheel cylinder.

According to a current application method (valve control method) in accordance with the illustrated embodiment, the controller 130 may apply a current to the solenoid valve 140, the current having a pattern in which the sine wave pattern is combined with the on/off pattern, in order to generate the LMV-controlled wheel pressure control using an upward sloping pattern with a cycle.

For reference, the y-axis of FIG. 3A represents a pressure value, the y-axis of FIG. 3B represents a current value, and the x-axis of FIGS. 3A and 3B represent time t.

When the applied current is increased, the solenoid valve 140 may be closed to lower the wheel pressure (in reality, the solenoid valve 140 blocks an additional flow). On the other hand, when the applied current is decreased, the solenoid valve 140 may be opened to raise the wheel pressure (in reality, the solenoid valve 140 does not block a flow).

At this time, although a pulse-wave current is applied, the solenoid valve 140 may not be immediately closed depending on its mechanical characteristic, the pulse-wave current indicating a pulse-wave current applied at the head and tail of FIG. 3B. Therefore, the wheel pressure may gradually drop until the solenoid valve 140 is completely closed. Then, the wheel pressure may be maintained at a predetermined level from the moment the solenoid valve 140 is completely closed.

When a high current is applied to the solenoid valve 140, the wheel pressure may be decreased (in a severe case, a pressure rise may not occur), and the vehicle may be pushed when a driver steps on the brake.

On the other hand, when no current is applied to the solenoid valve 140, the wheel pressure may be increases (in a severe case, a sudden pressure rise may occur). In this case, the vehicle behavior may be destabilized while the riding quality is degraded.

Therefore, the controller 130 may determine whether a difference between the M/C pressure and the wheel pressure is equal to or more than a preset reference value. When the determination result indicates that the difference between the M/C pressure and the wheel pressure is equal to or more than the reference value, the controller 130 may perform the wheel pressure control through the LMV control in an upward sloping pattern with a cycle.

Therefore, in order to perform the wheel pressure control in an upward sloping pattern, the controller 130 may apply a current in a downward sloping pattern with a cycle in consideration of the mechanical characteristic of the solenoid valve 140. At this time, the controller 130 may apply a sine wave current to repeatedly open/close the solenoid valve 140.

At this time, the slope of the waveform of the wheel pressure and the number of steps in the waveform of the wheel pressure may be changed in response to the peak-to-peak value and cycle of the sine wave current.

During this process, the controller 130 may apply one or more of the four quarter patterns of the sine wave current to the on/off control pattern. FIG. 3B illustrates that the first quarter pattern among the four quarter patterns of the sine wave current is applied to the on/off control pattern.

Referring to FIG. 3B, the controller 130 may apply the first quarter pattern among the four quarter patterns of the sine wave current to the on/off control pattern. At this time, the controller 130 may repeat a process of completely opening the solenoid valve 140 and then closing the solenoid valve 140 by applying a current according to the shape of the first quarter pattern of the sine wave current.

As the controller 130 repeats the process of completely opening the solenoid valve 140 and then closing the solenoid valve 140 by applying a current according to the shape of the first quarter pattern of the sine wave current, pulsation and noise may be reduced when the solenoid valve 140 is operated.

In the present embodiment, in order to raise the pressure of the wheel cylinder 150 when the difference between the pressure of the master cylinder 120 and the pressure of the wheel cylinder 150 is equal to or more than the reference value, the controller 130 may apply a current to the solenoid valve 140, the current having a downward sloping pattern with a cycle. At this time, the controller 130 may apply a sine wave current to repeatedly open/close the solenoid valve 140, and perform pressure control based on a waveform having the peak-to-peak value and cycle of the sine wave current. Thus, the waveform of the wheel pressure may have an upward sloping pattern which gradually has a cycle while the wheel pressure is repeatedly decreased, maintained and increased.

Referring to FIG. 3, the controller 130 may apply a sine wave current in a downward sloping pattern with a cycle, as the current applied to the solenoid valve 140. Thus, the wheel pressure may be changed into an upward sloping pattern with a stepwise cycle, in response to the sine wave current.

As the solenoid valve current is applied as a sine wave current having a downward sloping pattern, pulsation can be additionally reduced while the valve is prevented from being rapidly opened/closed. Thus, vibration and noise caused by the pulsation can be reduced.

In the present embodiment, when a pressure difference (ΔPressure) occurs between the master cylinder 120 and the wheel cylinder 150, the pressure of the wheel cylinder 150 can be gradually raised even though an error occurs between an actual pressure and an estimated pressure of the wheel cylinder. Thus, stable control performance can be maintained even though the road is suddenly changed, and noise and pulsation in the brake pipe can be reduced in comparison to the current on/off (or PWM) control using a pulse wave.

Furthermore, the present embodiment can be used in various systems such as an ABS, standard ESC system and electric brake booster, which control a flow rate using a solenoid valve. Although the present embodiment is not independently used, the present embodiment can be combined with an existing control method depending on a road condition (for example, unbalanced road, rough road or road surface change) or the control method.

The apparatus and method for controlling a solenoid valve current control of a brake system in accordance with the embodiment of the invention can perform the wheel pressure control in an upward sloping pattern with a cycle through the solenoid valve current control of the brake system. During the solenoid valve current control, the apparatus and method can additionally apply an impulse pattern to the sine wave-shaped solenoid control pattern, thereby limiting a pressure rise and promoting a pressure rise start.

Furthermore, the apparatus and method for controlling a solenoid valve current control of a brake system in accordance with the embodiment of the invention can generate the LMV-controlled wheel pressure by combining partial patterns of the sine wave with the on/off control method using a pulse wave during the solenoid valve current control.

Furthermore, the apparatus and method for controlling a solenoid valve current control of a brake system in accordance with the embodiment of the invention can reduce noise and pulsation of the brake pipe and adjust the application of the impulse pattern, compared to the on/off control method which rapidly controls the valve to maintain the robustness of the brake system. Therefore, the apparatus and method can obtain a pressure pulsation change similar to linear control.

Furthermore, the apparatus and method for controlling a solenoid valve current control of a brake system in accordance with the embodiment of the invention can improve the pressure control performance while reducing uncertainty in terms of the pressure control of the wheel cylinder.

Figure 4:
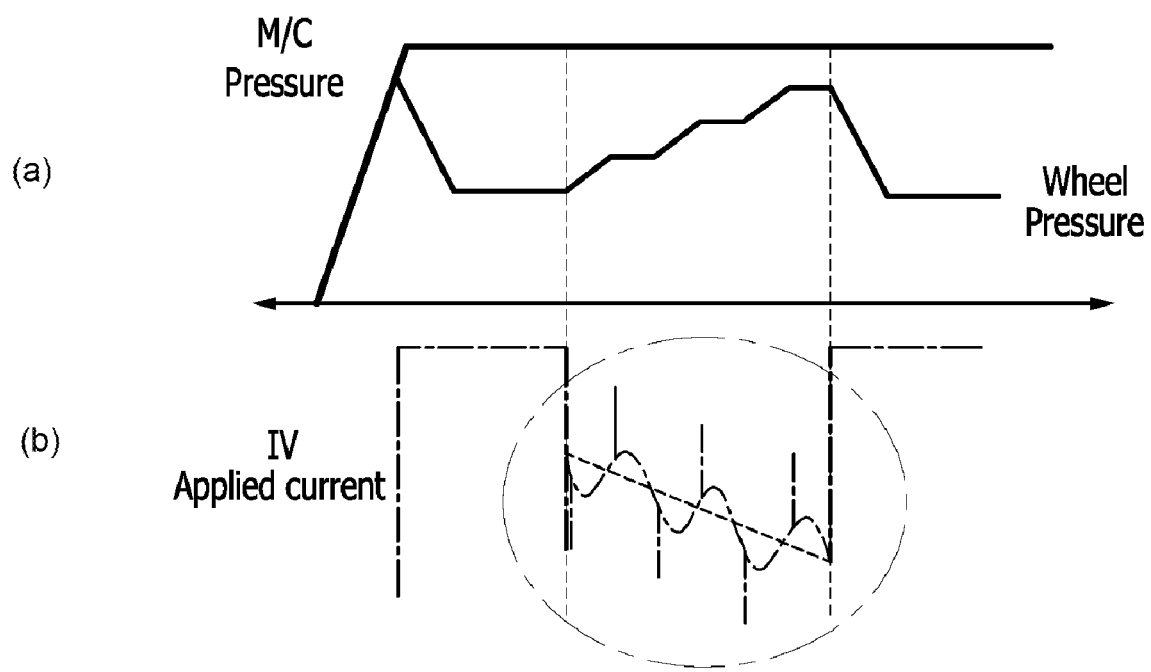
FIG. 4 illustrates a solenoid valve current control pattern of a brake system in accordance with another embodiment of the invention.

FIG. 4 illustrates a solenoid valve current control pattern of a brake system in accordance with another embodiment of the invention.

The controller 130 may perform wheel pressure control in an upward sloping pattern with a cycle through solenoid valve current control of the brake system, and clarify an effective point in a solenoid valve current control pattern of a sine wave pattern.

Referring to FIG. 4, the upper graph (FIG. 4A) illustrates the waveform of master cylinder pressure (M/C pressure) and the waveform of wheel cylinder pressure (wheel pressure), and the lower graph (FIG. 4B) illustrates the waveform of a current applied to the solenoid valve (or inlet valve (IV)) 140 of FIG. 1, which changes the pressure of the wheel cylinder.

According to a current application method (valve control method) in accordance with the present embodiment, the controller 130 may apply a sine wave current in a downward sloping pattern with a cycle, in order to perform the wheel pressure control in an upward sloping pattern with a cycle.

For reference, the y-axis of FIG. 4A represents a pressure value, the y-axis of FIG. 4B represents a current value, and the x-axis of FIGS. 4A and 4B represent time t.

When the applied current is increased, the solenoid valve 140 may be closed to lower the wheel pressure (in reality, the solenoid valve 140 blocks an additional flow). On the other hand, when the applied current is decreased, the solenoid valve 140 may be opened to raise the wheel pressure (in reality, the solenoid valve 140 does not block a flow).

At this time, although a pulse-wave current is applied, the solenoid valve 140 may not be immediately closed depending on its mechanical characteristic, the pulse-wave current indicating a pulse-wave current applied at the head and tail of FIG. 4B. Therefore, the wheel pressure may gradually drop until the solenoid valve 140 is completely closed. Then, the wheel pressure may be maintained at a predetermined level from the moment the solenoid valve 140 is completely closed.

When a high current is applied to the solenoid valve 140 as described above, the wheel pressure may be decreased (in a severe case, a pressure rise may not occur), and the vehicle may be pushed when a driver steps on the brake.

On the other hand, when no current is applied to the solenoid valve 140, the wheel pressure may be increased (in a severe case, a sudden pressure rise may occur). In this case, the vehicle behavior may be destabilized while the riding quality is degraded.

Therefore, the controller 130 may determine whether a difference between the M/C pressure and the wheel pressure is equal to or more than a preset reference value. When the determination result indicates that the difference between the M/C pressure and the wheel pressure is equal to or more than the reference value, the controller 130 may gradually perform the wheel pressure control in an upward sloping pattern with a cycle. For example, the upward sloping pattern may have a constant slope like stairs with a slope of 45 degrees.

Therefore, in order to perform the wheel pressure control in an upward sloping pattern, the controller 130 may apply a current in a downward sloping pattern with a cycle in consideration of the mechanical characteristic of the solenoid valve 140. At this time, the controller 130 may apply a sine wave current to repeatedly open/close the solenoid valve 140.

At this time, the slope of the waveform of the wheel pressure and the number of steps in the waveform of the wheel pressure may be changed in response to the peak-to-peak value and cycle of the sine wave current.

During this process, the controller 130 may additionally apply an impulse pattern to the sine wave solenoid control pattern.

That is, the controller 130 may additionally apply a rising pulse at an effective point of the sine wave current, i.e. a rising period of the sine wave current, and additionally apply a falling pulse at a falling period of the sine wave current.

As such, the controller 130 can reliably limit a pressure rise of the wheel cylinder by applying an impulse-type rising pattern in the rising period of the sine wave current during the solenoid valve current control, and promote a pressure rise start of the wheel cylinder by additionally applying an impulse-type falling pattern in the falling period of the sine wave current.

That is, the controller 130 may further clarify the effective point in the sine wave pattern, and additionally apply the impulse-type pattern. In this case, when a current is applied above a reference line (linear current), the pressure may be gently increased and then constantly maintained. However, the point may have a slight error based on a situation.

Figure 5:
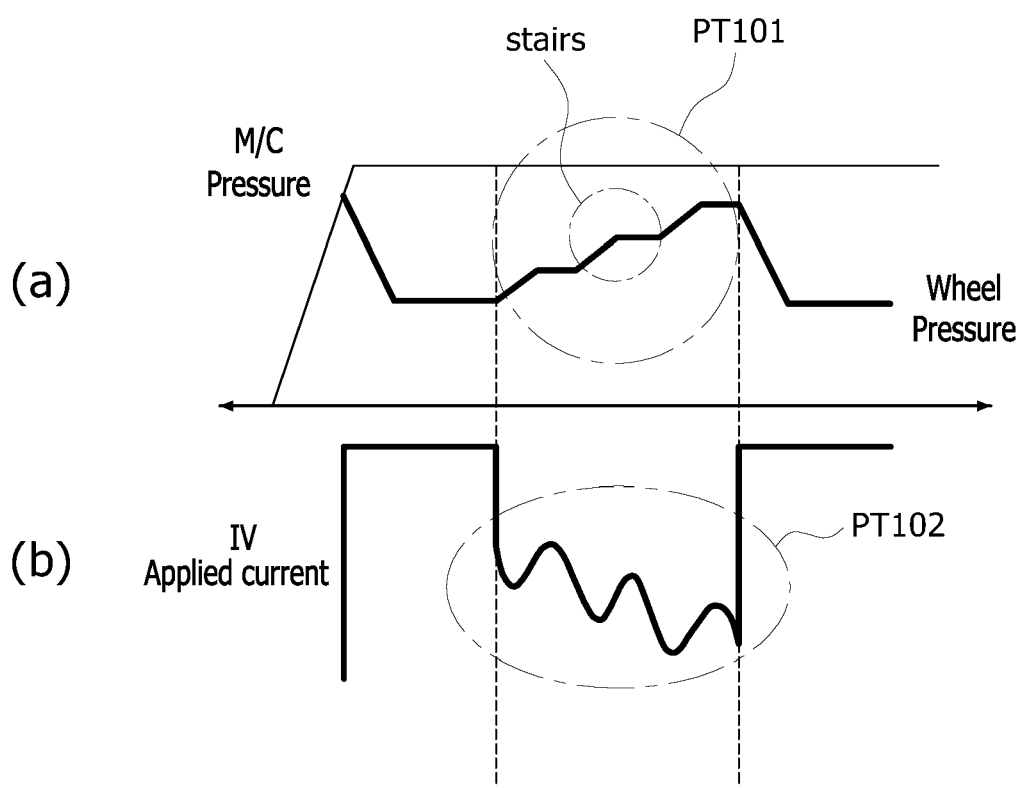
FIG. 5 illustrates a solenoid valve current control pattern of a brake system in accordance with another embodiment of the invention.

In the present embodiment, it has been described that the pressure of the wheel cylinder is changed in a stepwise manner, and FIG. 5 illustrates that the pressure of the wheel cylinder is changed in a stepwise manner. In reality, however, the pressure may be changed in an upward sloping pattern while being repeatedly decreased, maintained and increased (refer to FIG. 3).

In the present embodiment, in order to raise the pressure of the wheel cylinder 150 when the difference between the pressure of the master cylinder 120 and the pressure of the wheel cylinder 150 is equal to or more than the reference value, the controller 130 may apply a current to the solenoid valve 140, the current having a downward sloping pattern with a cycle. At this time, the controller 130 may apply a sine wave current to repeatedly open/close the solenoid valve 140, and perform pressure control based on a waveform having the peak-to-peak value and cycle of the sine wave current. Thus, the waveform of the wheel pressure may have an upward sloping pattern which gradually has a cycle while the wheel pressure is repeatedly decreased, maintained and increased.

Referring to FIG. 4, the controller 130 may apply a sine wave current in a downward sloping pattern with a cycle, as the current applied to the solenoid valve 140. Thus, the wheel pressure may be changed into an upward sloping pattern with a stepwise cycle, in response to the sine wave current.

As the solenoid valve current is applied as a sine wave current having a downward sloping pattern, pulsation can be additionally reduced while the valve is prevented from being rapidly opened/closed. Thus, vibration and noise caused by the pulsation can be reduced.

In the present embodiment, when a pressure difference (ΔPressure) occurs between the master cylinder 120 and the wheel cylinder 150, the pressure of the wheel cylinder 150 can be gradually raised even though an error occurs between an actual pressure and an estimated pressure of the wheel cylinder. Thus, stable control performance can be maintained even though the road is suddenly changed, and noise and pulsation in the brake pipe can be reduced in comparison to the current on/off (or PWM) control using a pulse wave.

Furthermore, the present embodiment can be used in various systems such as an ABS, standard ESC system and electric brake booster, which control a flow rate using a solenoid valve. Although the present embodiment is not independently used, the present embodiment can be combined with an existing control method depending on a road condition (for example, unbalanced road, rough road or road surface change) or the control method.

The apparatus and method for controlling a solenoid valve current control of a brake system in accordance with the embodiment of the invention can perform the wheel pressure control in an upward sloping pattern with a cycle through the solenoid valve current control of the brake system. During the solenoid valve current control, the apparatus and method can additionally apply an impulse pattern to the sine wave-shaped solenoid control pattern, thereby limiting a pressure rise and promoting a pressure rise start.

Furthermore, the apparatus and method for controlling a solenoid valve current control of a brake system in accordance with the embodiment of the invention can reduce noise and pulsation of the brake pipe and adjust the application of the impulse pattern, compared to the on/off control method which rapidly controls the valve to maintain the robustness of the brake system. Therefore, the apparatus and method can obtain a pressure pulsation change similar to linear control.

FIG. 5 illustrates a solenoid valve current control pattern of a brake system in accordance with another embodiment of the invention.

Referring to FIG. 5, the upper graph (FIG. 5A) illustrates the waveform of master cylinder pressure (M/C pressure) and the waveform of wheel cylinder pressure (wheel pressure), and the lower graph (FIG. 5B) illustrates the waveform of a current applied to the solenoid valve (or inlet valve IV) 140 of FIG. 1, which causes a pressure change of the wheel cylinder.

According to a current application method (valve control method) in accordance with the present embodiment, the controller 130 may apply a sine wave current in a downward sloping pattern with a cycle (PT102 of FIG. 5B), in order to perform the wheel pressure control in an upward sloping pattern with a cycle (PT101 of FIG. 5A).

For reference, the y-axis of FIG. 5A represents a pressure value, the y-axis of FIG. 5B represents a current value, and the x-axis of FIGS. 5A and 5B represents time t.

When the applied current is increased, the solenoid valve 140 may be closed to lower the wheel pressure (in reality, the solenoid valve 140 blocks an additional flow). On the other hand, when the applied current is decreased, the solenoid valve 140 may be opened to raise the wheel pressure (in reality, the solenoid valve 140 does not block a flow).

At this time, although a pulse-wave current is applied, the solenoid valve 140 may not be immediately closed depending on its mechanical characteristic, the pulse-wave current indicating a pulse-wave current applied to the head and tail of FIG. 7B. Therefore, the wheel pressure may gradually drop until the solenoid valve 140 is completely closed. Then, the wheel pressure may be maintained at a predetermined level from the moment the solenoid valve 140 is completely closed.

When a high current is applied to the solenoid valve 140, the wheel pressure may be decreased (in a severe case, a pressure rise may not occur), and the vehicle may be pushed when a driver steps on the brake.

On the other hand, when no current is applied to the solenoid valve 140, the wheel pressure may be increased (in a severe case, a sudden pressure rise may occur). In this case, the vehicle behavior may be destabilized while the riding quality is degraded.

Therefore, when a large difference occurred between the pressure of the master cylinder and the pressure of the wheel cylinder, the controller 130 needs to perform the wheel pressure control in an upward sloping pattern with a cycle, such that the waveform of the wheel pressure has a constant slope like stairs with a slope of 45 degrees. In order to perform the wheel pressure control in a desired pattern, the controller 130 may apply a current in a downward sloping pattern (PT102 of FIG. 5B) in consideration of the mechanical characteristic of the solenoid valve 140. At this time, the controller 130 may apply a sine wave current to repeatedly open/close the solenoid valve 140.

At this time, the slope of the waveform of the wheel pressure and the number of steps in the waveform of the wheel pressure may be changed in response to the peak-to-peak value and cycle of the sine wave current. The waveform of the wheel pressure may have an upward sloping pattern with a cycle (PT101 of FIG. 5A).

In the present embodiment, it has been described that the pressure of the wheel cylinder is changed in a stepwise manner, and FIG. 5 illustrates that the pressure of the wheel cylinder is changed in a stepwise manner. In reality, however, the pressure of the wheel cylinder may be changed in an upward sloping pattern while being repeatedly decreased, maintained and increased (refer to FIG. 7).

In the present embodiment, in order to raise the pressure of the wheel cylinder 150 when the difference between the pressure of the master cylinder 120 and the pressure of the wheel cylinder 150 is equal to or more than the reference value, the controller 130 may apply a current to the solenoid valve 140, the current having a downward sloping pattern with a cycle (PT102 of FIG. 5B). At this time, the controller 130 may apply a sine wave current to repeatedly open/close the solenoid valve 140, and perform pressure control based on a waveform having the peak-to-peak value and cycle of the sine wave current. Thus, the waveform of the wheel pressure may have an upward sloping pattern which gradually has a cycle while the wheel pressure is repeatedly decreased, maintained and increased.

Referring to FIG. 5, the controller 130 may apply the sine wave current in the downward sloping pattern (PT102 of FIG. 5A) with a cycle to the solenoid valve 140. Thus, the pressure of the wheel cylinder may be changed in the upward sloping pattern (PT101 of FIG. 5A) with a stepwise cycle, in response to the sine wave current.

As the solenoid valve current is applied as the sine wave current having the downward sloping pattern (PT102 of FIG. 5A), pulsation can be additionally reduced while the valve is prevented from being rapidly opened/closed. Thus, vibration and noise caused by the pulsation can be reduced.

Figure 6:
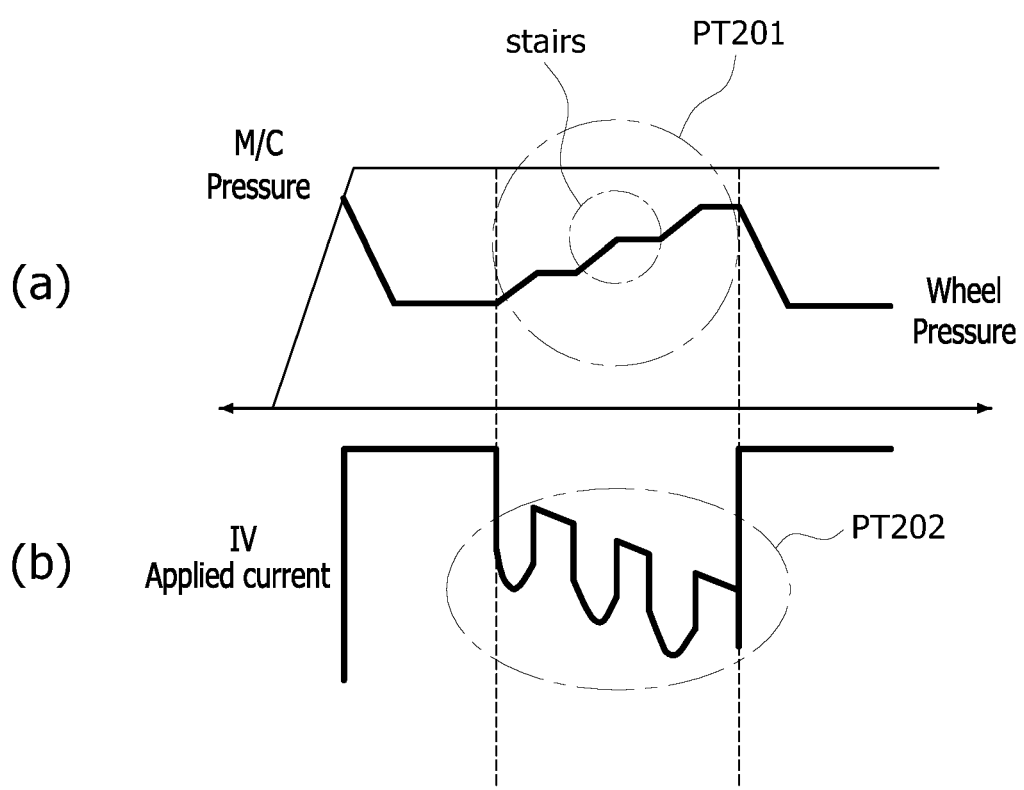
FIG. 6 illustrates a solenoid valve current control pattern of a brake system in accordance with another embodiment of the invention.

FIG. 6 illustrates a solenoid valve current control pattern of a brake system in accordance with another embodiment of the invention.

Referring to FIG. 6, the upper graph (FIG. 6A) illustrates the waveform of master cylinder pressure (M/C pressure) and the waveform of wheel cylinder pressure (wheel pressure), and the lower graph (FIG. 6B) illustrates the waveform of a current applied to the solenoid valve (or inlet valve IV) 140 of FIG. 1, which causes a pressure change of the wheel cylinder.

According to a current application method (valve control method) in accordance with the present embodiment, the controller 130 may apply a sine wave/pulse wave-combined current in a downward sloping pattern with a cycle (PT202 of FIG. 6B), in order to perform the wheel pressure control in an upward sloping pattern with a cycle (PT201 of FIG. 6A).

The applied current of FIG. 6B is different from the applied current of FIG. 5B in that the bottom ((−) period) of the waveform of the applied current of FIG. 6B has a sine wave shape, and the top ((+) period) of the waveform of the applied current of FIG. 6B has a pulse-wave (or square wave) shape. Therefore, although FIG. 6A illustrates a pressure change pattern PT201 of the wheel cylinder in the same shape as FIG. 5A, each of the steps may have a different slope in reality. At this time, the shapes of the bottom ((−) period) and the top ((+) period) of the waveform may be exchanged, and changed to other shapes except the sine wave or square-wave shape.

For reference, the y-axis of FIG. 6A represents a pressure value, the y-axis of FIG. 6B represents a current value, and the x-axis of FIGS. 6A and 6B represents time t.

When the applied current is increased, the solenoid valve 140 may be closed to lower the wheel pressure (in reality, the solenoid valve 140 blocks an additional flow). On the other hand, when the applied current is decreased, the solenoid valve 140 may be opened to raise the wheel pressure (in reality, the solenoid valve 140 does not block a flow).

At this time, although a pulse-wave current is applied, the solenoid valve 140 may not be immediately closed depending on its mechanical characteristic, the pulse-wave current indicating a pulse-wave current applied to the head and tail of FIG. 8B. Therefore, the wheel pressure may gradually drop until the solenoid valve 140 is completely closed. Then, the wheel pressure may be maintained at a predetermined level from the moment the solenoid valve 140 is completely closed.

When a high current is applied to the solenoid valve 140, the wheel pressure may be decreased (in a severe case, a pressure rise may not occur), and the vehicle may be pushed when a driver steps on the brake.

On the other hand, when no current is applied to the solenoid valve 140, the wheel pressure may be increased (in a severe case, a sudden pressure rise may occur). In this case, the vehicle behavior may be destabilized while the riding quality is degraded.

Therefore, when the pressure difference between the pressure of the master cylinder and the pressure of the wheel cylinder is equal to or more than the reference value, the controller 130 needs to perform the wheel pressure control in an upward sloping pattern with a cycle, such that the waveform of the wheel pressure has a constant slope like stairs with a slope of 45 degrees. In order to perform the wheel pressure control in a desired pattern, the controller 130 may apply a current in a downward sloping pattern (PT202 of FIG. 6B) in consideration of the mechanical characteristic of the solenoid valve 140. At this time, the controller 130 may apply a sine wave/pulse wave-combined current to repeatedly open/close the solenoid valve 140.

At this time, the slope of the waveform of the wheel pressure and the number of steps in the waveform of the wheel pressure may be changed in response to the peak-to-peak value and cycle of the sine wave current. The waveform of the wheel pressure may have an upward sloping pattern with a cycle (PT201 of FIG. 6A).

In the present embodiment, it has been described that the pressure of the wheel cylinder is changed in a stepwise manner, and FIG. 6 illustrates that the pressure of the wheel cylinder is changed in a stepwise manner. In reality, however, the pressure of the wheel cylinder may be changed in an upward sloping pattern while being repeatedly decreased, maintained and increased (refer to FIG. 7).

In the present embodiment, in order to raise the pressure of the wheel cylinder 150 when a difference occurred between the pressure of the master cylinder 120 and the pressure of the wheel cylinder 150, the controller 130 may apply a current to the solenoid valve 140, the current having a downward sloping pattern with a cycle (PT202 of FIG. 6B). At this time, the controller 130 may apply a sine wave/pulse wave-combined current to repeatedly open/close the solenoid valve 140, and control the peak-to-peak value and cycle of the sine wave/pulse wave-combined current to preset values. Thus, the waveform of the wheel pressure may have an upward sloping pattern (PT201 of FIG. 6A) which gradually has a cycle while the wheel pressure is repeatedly decreased, maintained and increased.

Referring to FIG. 6, the controller 130 may apply the sine wave/pulse wave-combined current in the downward sloping pattern (PT202 of FIG. 6B) with a cycle to the solenoid valve 140. Thus, the pressure of the wheel cylinder may be changed in the upward sloping pattern (PT201 of FIG. 6A) with a stepwise cycle, in response to the sine wave/pulse wave-combined current.

As the solenoid valve current is applied as the sine wave/pulse wave-combined current having the downward sloping pattern (PT202 of FIG. 6B), pulsation can be additionally reduced while the valve is prevented from being rapidly opened/closed. Thus, vibration and noise caused by the pulsation can be reduced.

Figure 7:
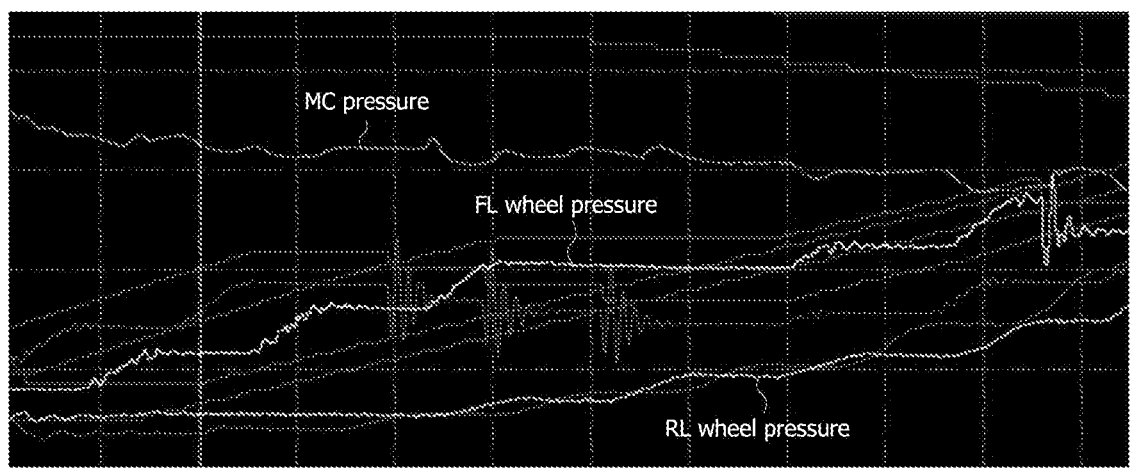
FIG. 7 shows a wheel pressure test result obtained by applying the method for controlling a solenoid valve current of a brake system in accordance with the embodiment of the invention.

FIG. 7 shows a wheel pressure test result obtained by applying the method for controlling a solenoid valve current of a brake system in accordance with the embodiments of the invention. By applying the solenoid valve current illustrated in FIG. 7, the pressure of the wheel cylinder may be controlled in an upward sloping pattern with a stepwise cycle. At this time, the stepwise cycle may indicate that the pressure is changed in an upward sloping pattern while being repeatedly decreased, maintained and increased, but not indicate the same shape as stairs.

In the present embodiment, when a pressure difference (ΔPressure) occurs between the master cylinder 120 and the wheel cylinder 150, the pressure of the wheel cylinder 150 can be gradually raised even though an error occurs between an actual pressure and an estimated pressure of the wheel cylinder. Thus, stable control performance can be maintained even though the road is suddenly changed, and noise and pulsation in the brake pipe can be reduced in comparison to the current on/off (or PWM) control using a pulse wave.

Furthermore, the present embodiment can be used in various systems such as an ABS, standard ESC system and electric brake booster, which control a flow rate using a solenoid valve. Although the present embodiment is not independently used, the present embodiment can be combined with an existing control method depending on a road condition (for example, unbalanced road, rough road or road surface change) or the control method.

In accordance with the embodiments of the invention, the apparatus and method for controlling a solenoid valve current of a brake system can perform wheel pressure control in an upward sloping pattern with a cycle through the solenoid valve current control of the brake system.

Furthermore, the apparatus and method for controlling a solenoid valve current of a brake system generate the wheel pressure in the LMV control manner by combining patterns of the sine wave to the on/off control method using a pulse wave during the solenoid valve current control.

Furthermore, the apparatus and method for controlling a solenoid valve current of a brake system can form the pressure in a shape close to a desired pattern even when an error occurs in a pressure difference between the master cylinder and the wheel cylinder, and maintain stable control performance even when the road is suddenly changed.

Furthermore, the apparatus and method for controlling a solenoid valve current of a brake system can reduce noise and pulsation of the brake pipe in comparison to the on/off control method which rapidly controls the valve for the robustness of the brake system, and obtain a pressure pulsation change similar to linear control by adjusting the application of the impulse pattern.

Furthermore, the apparatus and method for controlling a solenoid valve current of a brake system reduce uncertainty in terms of the pressure control of the wheel cylinder, and improve the pressure control performance.

Furthermore, the apparatus and method for controlling a solenoid valve current of a brake system can additionally apply the impulse pattern to the sine wave solenoid control pattern during the solenoid valve current control, thereby limiting a pressure rise while promoting a pressure rise start.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A method for controlling a solenoid valve current of a brake system having a master cylinder, a wheel cylinder and a solenoid valve to control flow from the master cylinder to the wheel cylinder, the method comprising:
    determining, by a controller, whether the difference between a pressure of a master cylinder and a pressure of a wheel cylinder is equal to or greater than a preset reference value; and
    controlling, by the controller, pressure of the wheel cylinder by applying a sine wave current pattern to an on/off control pattern while applying a current to the solenoid valve to adjust the pressure of the wheel cylinder such that the pressure of the wheel cylinder is changed cyclically in an upward sloping pattern, when the difference between the pressure of the master cylinder and the pressure of the wheel cylinder is equal to or greater than the preset reference value,
    wherein the controller applies one or more of first quarter pattern of a sine wave current, a second quarter pattern of a sine wave current, a third quarter pattern of a sine wave current, and a fourth quarter pattern of a sine wave current within the on/off control pattern.

2. The method of claim 1, wherein the current is cyclically applied to the solenoid valve to change the pressure of the wheel cylinder in a linear magnetic valve (LMV) control manner.

3. The method of claim 1, wherein the controller completely opens the solenoid valve by applying a current according to an on/off control method, and then closes the solenoid valve by applying a current according to the shape of the first quarter pattern of the sine wave current.

4. The method of claim 1, wherein after the solenoid valve is closed by applying a current according to the on/off control method, the controller opens the solenoid valve by applying a current according to the third quarter pattern of the sine wave current, and then closes the solenoid valve by applying a current according to the first quarter pattern of the sine wave current.

5. The method of claim 1, wherein after the solenoid valve is closed by applying a current according to the on/off control method, the controller opens the solenoid valve by applying a current according to the second quarter pattern of the sine wave current, and then closes the solenoid valve by applying a current according to the first quarter pattern of the sine wave current.

6. The method of claim 1, wherein a wheel pressure waveform of the wheel cylinder is changed in response to a peak-to-peak value, a cycle and a slope of the sine wave current.

7. The method of claim 1, wherein the upward sloping pattern of the wheel pressure comprises a pressure increase pattern which is changed in an upward sloping pattern as a whole while the pressure of the wheel cylinder is repeatedly decreased, maintained and increased.

8. An apparatus for controlling a solenoid valve current of a brake system, the apparatus comprising:
    a solenoid valve to adjust pressure in a wheel cylinder; and
    a controller to generate the pressure in the wheel cylinder by applying a sine wave current pattern to an on/off control pattern while applying a current to the solenoid valve such that the pressure in the wheel cylinder is changed cyclically in an upward sloping pattern, when a difference between pressure in the master cylinder and pressure in the wheel cylinder is equal to or greater than a preset reference value,
    wherein the controller applies one or more of first quarter pattern of a sine wave current, a second quarter pattern of a sine wave current, a third quarter pattern of a sine wave current, and a fourth quarter pattern of a sine wave current within the on/off control pattern.

9. The apparatus of claim 8, wherein the solenoid valve configured to adjust pressure in the wheel cylinder comprises a normally open valve or inlet valve.

10. The apparatus of claim 8, wherein the controller completely opens the solenoid valve by applying a current according to an on/off control method, and then closes the solenoid valve by applying a current according to the shape of the first quarter pattern of the sine wave current.

11. The apparatus of claim 8, wherein after the solenoid valve is closed by applying a current according to the on/off control method, the controller opens the solenoid valve by applying a current according to the third quarter pattern of the sine wave current, and then closes the solenoid valve by applying a current according to the first quarter pattern of the sine wave current.

12. The apparatus of claim 8, wherein after the solenoid valve is closed by applying a current according to the on/off control method, the controller opens the solenoid valve by applying a current according to the second quarter pattern of the sine wave current, and then closes the solenoid valve by applying a current according to the first quarter pattern of the sine wave current.

13. The apparatus of claim 8, wherein a wheel pressure waveform of the wheel cylinder is changed in an LMV control manner based on an upward sloping pattern and in response to a peak-to-peak value, a cycle and a slope of the sine wave current.

14. The apparatus of claim 8, wherein the upward sloping pattern of the wheel pressure comprises a pressure increase pattern which is changed in an upward sloping pattern as a whole while the pressure of the wheel cylinder is repeatedly decreased, maintained and increased.

15. An apparatus for controlling a solenoid valve current of a brake system, the apparatus comprising:
    a solenoid valve to adjust pressure in a wheel cylinder; and
    a controller to apply a current with a cycle in a downward sloping pattern to the solenoid valve such that the pressure of the wheel cylinder is changed in an upward sloping pattern, and additionally apply an impulse current to the solenoid valve, when a difference between pressure in a master cylinder and pressure in the wheel cylinder is equal to or greater than a preset reference value,
    wherein the controller additionally applies an impulse pattern at a preset effective point in a sine wave current.

16. The apparatus of claim 15, wherein the effective point is set in each of a rising period and a falling period of the sine wave current.

17. The apparatus of claim 16, wherein the controller applies an impulse-type rising pattern in the rising period of the sine wave current, and applies an impulse-type falling pattern in the falling period of the sine wave current.

* * * * *